Patented Feb. 6, 1923.

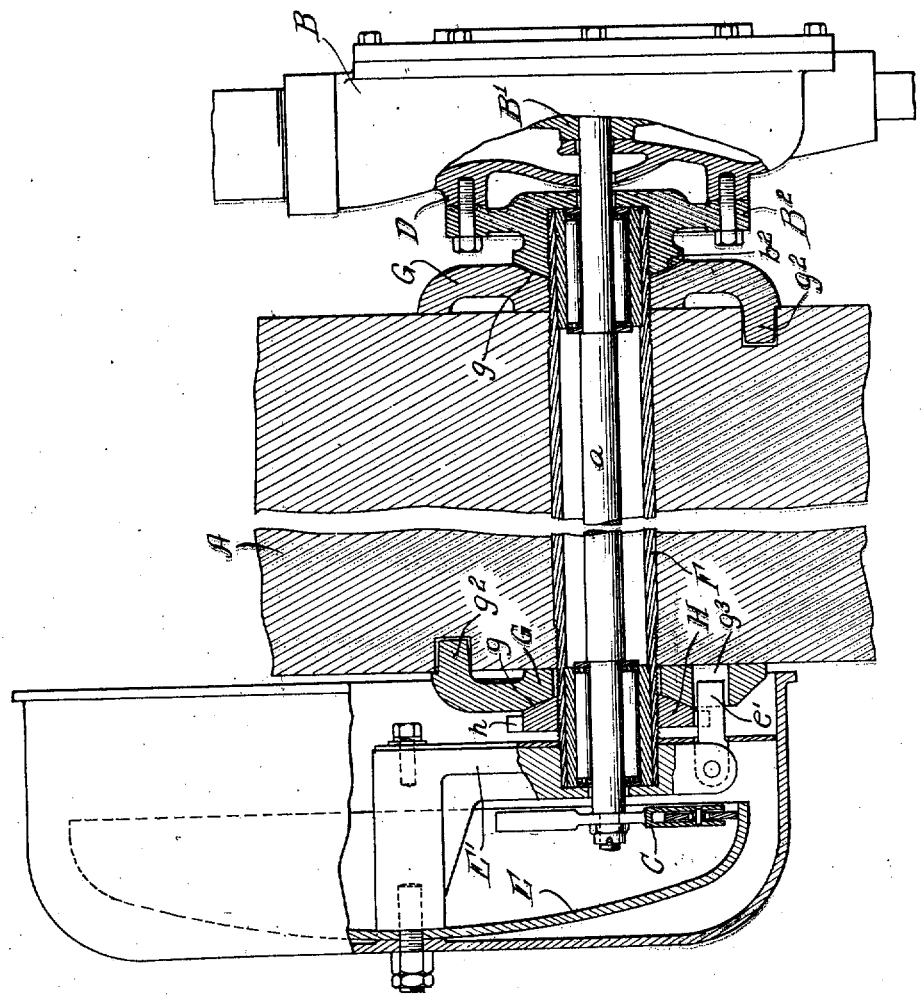

1,444,285

UNITED STATES PATENT OFFICE.

EMIL TYDEN, OF EVANSTON, ILLINOIS.

MOUNTING MEANS FOR MOTOR AND DRIVE CONNECTIONS.

Application filed March 8, 1922. Serial No. 542,180.

*To all whom it may concern:*

Be it known that I, EMIL TYDEN, a citizen of the United States, and resident of Evanston, in the county of Cook and State of Illinois, have invented certain new and useful Improvements in Mounting Means for Motor and Drive Connections, of which the following is a specification, reference being had to the accompanying drawings, forming a part thereof.

The purpose of this invention is to provide an improved construction of mounting means for a motor engine device which are to be mounted on opposite sides of a supporting wall with the shaft connections extending therethrough. It consists in the elements and features of construction shown and described, as indicated in the claims.

In the drawings:

The figure is a section axial with respect to the motor shaft of a motor and a driven device which are mounted upon opposite sides of a wall by means embodying this invention.

In the construction shown, A represents a wall on the opposite sides of which there are mounted a motor and a device to be driven by the motor by means of a shaft extending through the wall. The motor may be understood to be a water motor of which B is the casing and $B^1$ the rotor. The driven device will be understood to be an alarm device of which C is the hammer arm which is rotated by the motor shaft for striking the ball, E. Any other devices, respectively driving and driven, mounted on opposite sides of a support, as a wall through which the shaft connecting them extends, may be substituted for the water motor and alarm device respectively, without departing from the spirit of this invention. The motor casing or frame, D, and the alarm frame or bell support, $E^1$, are secured to the opposite ends of a tubular connecting and journal bearing member, F, which extends through the wall. In this tubular member the shaft, $a$, by which the motor drives the alarm hammer is journaled and longitudinally stopped in any suitable and convenient manner, the details of which do not require description for the purpose of making the present understood. On the tubular journal bearing member, F, at opposite sides of the wall there are placed washer plates, G, G, for bearing against and engaging with the opposite walls, respectively, the engagement for holding the washer plates non-rotatable about the tubular member, E, being by a lug, $g^2$, projecting from the washer plate near its circumference and entering a hole cut in the wall for that purpose. The motor casing, B, comprises a terminal fitting, $B^2$, which constitutes the means of securing the casing onto the tubular journal bearing member, E; and this terminal is spherically convex at the end from which at the center the journal bearing member, F, extends, said spherical convexity, $b^2$, being adapted to seat in the spherically concave seat, $g$, formed upon the outer side of the washer plate. At the opposite end there is provided, screwed onto the end of the tubular journal bearing member, E, back of the bell support, $E^1$, a nut, H, which is convex at the inner side for seating in the spherical concavity, $g$, of the washer plate at that side of the wall.

It will be understood that the construction described will be assembled on the wall by inserting the tubular journal bearing member, F, which has first been screwed onto the terminal of the motor casing with the shaft of the motor properly extended through and journaled in it, and with the right hand washer plate, G, positioned on it,—through the wall in which an adequate aperture will first have been made. The other washer plate, G, will then be passed onto the tubular member, F, and engaged with the wall, followed by the nut, H, which will be screwed up against said washer plate, the spherical seating of the washer plates on the one hand, and the motor casing terminal and nut on the other hand, permitting the washer plates to accommodate themselves to the planes of the two opposite sides of the walls which may not in all cases be parallel. In the particular structure shown, in which the actuated device is the alarm bell hammer, the bell-supporting bracket, which corresponds to the frame or casing of the motor, is applied to the end of the tubular journal bearing member, E, either before or after tightening up the nut, but after the nut has been screwed onto the said journal bearing member. As shown in the drawings, this bracket or bell support is telescopically fitted onto the end of the journal bearing member, E, without thread, so that it may be passed onto said member at the desired position which is with the axis of the bell directly above the axis of the said journal bearing member, E; and for holding it at this position the washer plate, G, at this side has an aperture, $g^3$, which is engaged with the stud, $d^1$, projecting from the bracket, D, for that purpose. This expedient may also be made to serve the purpose of locking the nut H, by making this nut peripherally notched as seen at $h$, the notches being at short intervals circumferentially, that one of them may certainly be registered with the aperture, $g^3$, at the position at which the nut becomes tight, so that the stud, $d^1$, entering said aperture will also enter a notch of the nut.

I claim:—

1. In combination with a driving and a driven rotor, a shaft which connects them; a journal bearing member for said shaft adapted to extend through a supporting wall or the like; washer plates on said journal bearing member adapted to be lodged against and engaged with the opposite sides of the wall, and stop members secured on the journal bearing member, said stop members being seated on the washer plates respectively, the co-operating faces at such seatings being spherically concave and convex respectively, one of the stop members being adjustable along the bearing member for adaptation to the thickness of the wall.

2. In combination for mounting on opposite sides of a wall, a motor and a device driven thereby; a tubular member extending through the wall for connecting the motor frame or casing and the frame or casing of the driven device; a driving shaft journaled in said tubular member extending from the rotating element of the motor to the actuated element of said driven device, the motor casing having for connection with the tubular member a terminal adapted also for connection with the wall, and which is screwed onto the tubular member; a nut screwed onto the opposite end of the tubular member; washer plates for seating said motor casing terminal and said nut lodged against the wall at opposite sides thereof, said washer plates on the one hand, and said terminals and nut on the other hand, having co-operating seats which are respectively spherically concave and convex, for permitting the washer plates to accommodate themselves to the plane of the wall surfaces on which they are respectivly seated.

3. In the construction defined in claim 1, foregoing, the adjustable stop being a nut screwed along the journal bearing member for its adjustment, and means carried by the journal bearing member outside said nut for locking the nut.

In testimony whereof, I have hereunto set my hand at Chicago, Illinois, this 3rd day of March, 1922.

EMIL TYDEN.